June 27, 1967  A. F. FARR  3,327,898
TITRATION MEANS AND METHOD
Filed Oct. 19, 1964
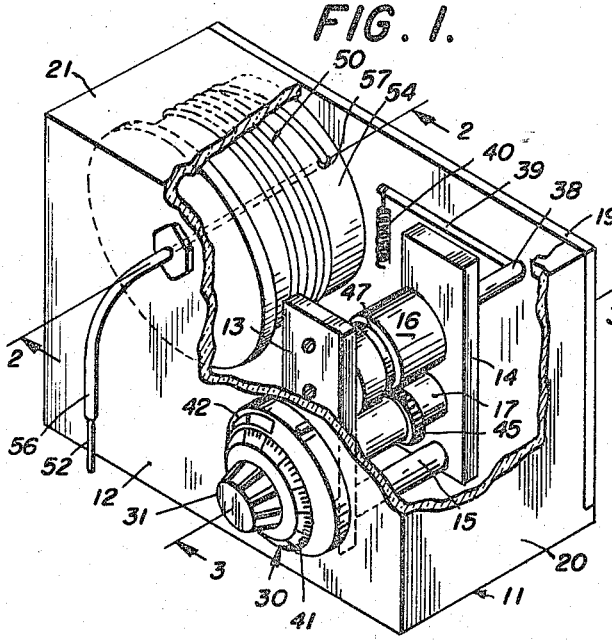
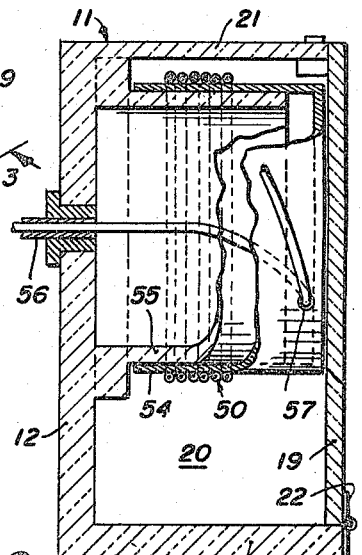
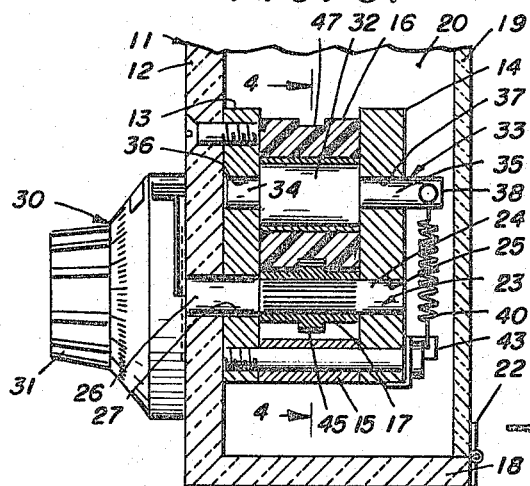
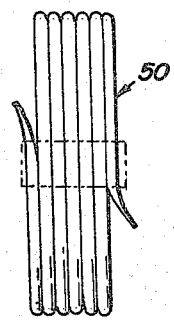
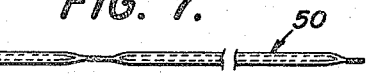
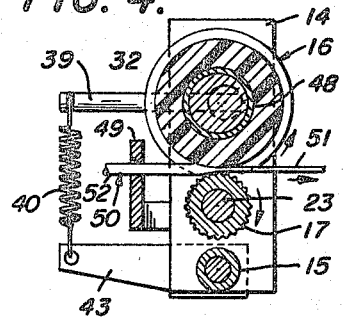
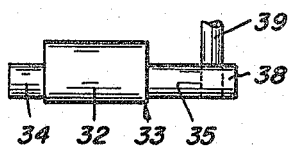
INVENTOR
ANDREW F. FARR
BY
ATTORNEY United States Patent Office 3,327,898
Patented June 27, 1967

3,327,898
TITRATION MEANS AND METHOD
Andrew F. Farr, South Gate, Calif., assignor to Bioconsultants Inc., Glendale, Calif., a corporation of California
Filed Oct. 19, 1964, Ser. No. 404,881
6 Claims. (Cl. 222—1)

This invention relates to a means and method for making analytical chemical titrations and the like, and in particular to a measuring dispensing means for liquids involving a reagent-filled small bore or capillary plastic tube.

One object of the invention is to provide means and a method for dispensing a liquid reagent in small measured increments. Another object is to provide a readily usable supply of a titrating reagent liquid in a relatively small diameter stable storage unit, from which it may be dispensed in measured small amounts as in a titration procedure. Another object is to provide a flexible plastic capillary tubing containing a liquid chemical reagent from which a quantity of the reagent may be discharged, and measured by the length of capillary tubing from which the reagent is squeezed out. Another object is to provide a squeezer machine for discharging the contained reagent liquid from a length of flexible collapsible capillary tubing, the quantity of discharged liquid being measured by measuring the length of tubing collapsed by said machine. A further object is to provide means for feeding a length of filled capillary tubing into a squeezer machine whereby the liquid discharged from the open end of the capillary tubing is proportional to the length of tubing passing through said machine.

These and other objects are attained by my invention, which will be understood from the accompanying drawings in which FIG. 1 is a perspective view, with parts of the housing broken away, showing a preferred form of capillary tube squeezer machine;

FIG. 2 is a cross-sectional view taken on the line 2—2 of FIG. 1;

FIG. 3 is a cross-sectional view taken on the line 3—3 of FIG. 1;

FIG. 4 is a cross-sectional view taken on the line 4—4 of FIG. 3;

FIG. 5 is an elevational view of the eccentric shaft means of the driven squeeze roller;

FIG. 6 is a coiled reagent-filled capillary tube package; and

FIG. 7 is a length of reagent-filled capillary tube having intermediate sealed short lengths defining definite lengths of capillary tubing and definite amounts of contained reagent.

Referring to the drawings, a box-like housing 11, preferably made partly of transparent parts (to facilitate observation during operation), consists of a front panel 12 on which is mounted an assembly of a vertical front frame member 13 and a rear frame member 14, spaced apart by a spacer member 15, between which frame members the driven roller 16 and the driver roller 17 are mounted. The housing 11 has a bottom plate 18, back plate 19, end plates 20, and a cover plate 21, and may be fabricated from plates adhesively joined, or held together by screws or by other fastening means. The back plate may be attached to the bottom plate 18 by spring hinges 22, to provide easy access to the interior of the housing, and to hold the capillary tube coil package in operative position as will be described.

The driver roller 17 is provided with a keyed shaft 23 whose inner end 24 is mounted for rotation in the bearing hole 25 in the rear frame member 14; and whose outer end 26 is mounted for rotation in the bearing hole 27 in the front frame member 13, the outer end of the shaft being further extended through the front panel 12 of the housing 11 where it makes operative connection with a turn counter 30.

The driven roller 16 rotates on the eccentrically disposed enlarged portion 32 of a shaft 33 whose ends 34 and 35 are mounted for rotation in the bearing holes 36 and 37 respectively of the vertical frame members 13 and 14. The extended end portion 38 of the shaft end 35 is provided with a radial arm 39 to the outer end of which is attached a tension coil spring 40 whose other end is anchored on a side arm 43 extending from the vertical frame member 14. The tension of the spring 40 acting through the radial arm 39 positions the eccentric portion 32 so that the driven roller 16 rotates thereon because of surface contact with the surface of the driver roller 17, which is hand turned by the turning knob 31 of the turn counter 30. The turn counter 30 is provided with index markings 41 for direct reading of the angle of turning of the shaft 23 and a counter 42 for the total number of complete revolutions. A "Duodial" turns counting instrument known as Model R3, manufactured by Helipot Division of Beckman Instruments Inc. is shown, but other turning counters may also be employed.

The squeezing rollers may be cylindrical and plain surfaced but preferably the driver roller 17 is provided with an enlarged center band 45 which meshes with a corresponding groove 47 in the periphery of the driven roller 16, which as shown is made of rubber or other resilient material mounted on a tubular mandrel 48 which rotates on the enlarged eccentric portion 32 of the shaft 33.

A vertical guide post 49 is mounted on the frame forwardly of the rollers 16 and 17 to direct the flexible capillary tubing 50 into the grooved squeezing channel between the rollers 16 and 17.

A coiled length of flexible plastic capillary tubing 50, filled with reagent liquid, is fed, by one end 51, through the squeezer rollers 16 and 17, whereby to expel the contained liquid from the other tubing end 52, the latter end being open. A package consisting of a selected coiled length of capillary tubing 50 mounted on a hollow supporting cylinder 54 (such as a piece of cardboard tubing) is provided. The supporting cylinder 54 may, in turn, be slipped over a fixed cylinder 55 which is mounted on the front panel 12 of the housing, there being an axial opening through the panel 12 communicating with an outlet tube 56 which extends outwardly and downwardly in position to deliver the liquid discharged from the discharging end 52 of the capillary tubing which is encased within said outlet tube 56. The discharge end portion 52 of the capillary tubing from the coil is passed inside the hollow support cylinder 54 through a hole 57 therein, and then into and through the delivery tube 56. The support cylinder 54 is held in place on the fixed cylinder 55 by the spring hinge pressed back plate 19 (for example) or by other means.

The operation of the squeezer machine consists generally in mounting a length of capillary tubing filled with a liquid reagent coiled on a hollow support cylinder 54, the discharge end portion 52 of the capillary being passed through a hole 57 to the inside of the cylinder, and thence through the outlet tube 56, the protruding end of the capillary tubing being open or being subsequently opened. The other end of the capillary tubing is then passed from the support cylinder through the guide post 49, into the squeezing space between the rollers 16 and 17. The discharge end 52 of the capillary tubing may then be opened (as by cutting off the closed portion). Turning the knob 31 on the counter means 30 causes the squeezing and collapsing of the capillary tubing and the expulsion of a portion of the reagent liquid corresponding to the length of the capillary tubing squeezed and collapsed by its passing between the rollers 16 and 17.

The term "capillary tube" or "capillary tubing" as used herein defines a small bore synthetic plastic tubing having a bore sufficiently small that a liquid contained therein remains in place by capillarity. In general the bore size is of the order of magnitude of 1/32 to 1/16 inch. The capillary tubing is selected for its insolubility in the liquid to be held therein, and well known materials such as "Nylon," "Teflon," "Tygon," rubber, polyvinyl chloride, polyethylene, polystyrene, and the like, or thin metal may be used.

When capillary tubing is used which does not remain collapsed after passing through the squeeze rollers (such as polyvinyl and some rubber compositions), the squeeze machine may be used in reverse, and measured amounts of liquid may be drawn into the capillary tubing from the open or normal discharge end thereof.

It is contemplated that standardized titrating liquids contained and stored in selected lengths of the capillary tubing may be kept in stock and selected for the chemical analytical procedure as required. This is highly advantageous for making occasional analyses without entailing the immediate preparation of standardized titrating solutions.

The selected lengths of filled capillary tubing may be packaged and marketed as coils on inexpensive supporting cylinders (as above described) or as open helical coils, as shown in FIG. 6 or as sealed-off unit lengths, as indicated in FIG. 7. Serpentine folds or similar other arrangements of the capillary tubing in the marketed reagent packages may be employed.

The many advantages of my invention will be apparent from the above description. The objectives stated in the beginning have been attained by the described invention.

I claim:

1. A squeezer machine for ejecting liquid from a filled flexible capillary tubing comprising a frame means; a driver roller having a shaft, and bearings mounting said shaft and roller for rotation on said frame means; a driven roller mounted on an axial shaft supported on said frame means; turning means for rotating said driver roller; pressure means to hold said rollers in contact; means for supporting a length of flexible capillary tubing filled with a liquid chemical reagent on or adjacent said frame means, with guide means for directing one end of said flexible capillary tubing between said driver and driven rollers; outlet holding means associated with said supporting means for holding the opposite end portion of said capillary tubing in a position to delivery the liquid contents thereof to a receptacle; and means associated with said turning means for measuring the length of capillary tubing passing through said driver and driven rollers when said turning means is actuated.

2. The squeezer machine defined in claim 1 in which the means for measuring the length of tubing is a turn counter operatively attached to the shaft of said driver roller.

3. The squeezer machine defined in claim 1 in which the pressure means for holding the rollers in squeezing contact includes an eccentric shaft portion for mounting said driven roller, and spring biased lever means to position said eccentric shaft portion to produce a desired pressure between said driven and driver rollers.

4. The squeezer machine defined in claim 1 in which the surfaces of said rollers have mating contours.

5. In an analytical chemical procedure, the method of dispensing accurately measured amounts of a reagent liquid comprising filling a flexible synthetic plastic capillary tube having a uniform bore with the liquid, closing both ends of said tube, mounting said tube in an extruding apparatus, opening one end of said tube for discharge of fluid therefrom, and then progressively collapsing said tube beginning at said closed end to discharge liquid from the open opposite end of said tube, and measuring the length of collapsed tube whereby to ascertain the quantity of liquid discharged.

6. In an analytical chemical procedure, the method of dispensing accurately measured small increments of a reagent liquid comprising filling a flexible synthetic plastic capillary tube having a uniform bore with the liquid, closing both ends of said tube, mounting said tube in an extruding apparatus, opening one end of said tube for discharge of fluid therefrom, and then progressively collapsing said tube in small increments of length beginning at said closed end to discharge liquid in small increments of volume from the open opposite end of said tube, and measuring each increment of tubing collapsed whereby to ascertain the quantity of liquid discharged at each increment.

References Cited

UNITED STATES PATENTS

| | | | |
|---|---|---|---|
| 1,098,514 | 6/1914 | Maddox | 222—214 |
| 1,254,115 | 1/1918 | Brand | 206—46 |
| 1,647,689 | 11/1927 | Dumm | 83—522 |
| 1,859,174 | 5/1932 | Sassano | 222—102 |
| 2,181,006 | 11/1939 | Beale | 222—23 |
| 2,340,218 | 1/1944 | Grise | 222—23 |
| 2,434,118 | 1/1948 | Newman. | |
| 2,465,453 | 3/1949 | Holbrook | 83—522 X |
| 2,539,395 | 1/1951 | Banks. | |
| 2,595,493 | 5/1952 | Salby et al. | 222—214 X |
| 2,649,993 | 8/1953 | Burdick et al. | 222—1 |
| 2,695,117 | 11/1954 | Daniels | 222—214 |
| 2,839,137 | 6/1958 | Hascom | 83—522 X |
| 2,874,525 | 2/1959 | Kirkpatrick et al. | 222—102 X |
| 2,946,486 | 7/1960 | Gilmont | 73—425.6 X |
| 2,995,312 | 8/1961 | Nagel | 242—54 |
| 3,011,684 | 12/1961 | Corneil | 222—214 |
| 3,028,000 | 4/1962 | Clements et al. | |
| 3,033,420 | 5/1962 | Thomas et al. | 222—1 |
| 3,072,296 | 1/1963 | Isreeli | 103—149 X |
| 3,132,744 | 5/1964 | Scharf | 206—84 |
| 3,150,377 | 9/1964 | Keznickl | 266—100 X |
| 3,152,332 | 10/1964 | Miyauchi | 226—100 X |
| 3,159,276 | 12/1964 | Moore | 206—84 |
| 3,178,065 | 4/1965 | Auerswald | 206—84 X |
| 3,189,227 | 6/1965 | Hobbs et al. | 222—94 |
| 3,194,199 | 7/1965 | Walter | 242—54 X |
| 3,212,677 | 10/1965 | Hronas | 222—81 |

RAPHAEL M. LUPO, *Primary Examiner.*